US011931301B2

(12) United States Patent
Malcolm et al.

(10) Patent No.: US 11,931,301 B2
(45) Date of Patent: Mar. 19, 2024

(54) LITTER LIFT SYSTEM

(71) Applicant: Oshkosh Corporation, Oshkosh, WI (US)

(72) Inventors: Gregory D. Malcolm, Oshkosh, WI (US); Matthew B. Vetting, Oshkosh, WI (US); Rodney M. Miller, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/705,456

(22) Filed: Mar. 28, 2022

(65) Prior Publication Data

US 2022/0211560 A1 Jul. 7, 2022

Related U.S. Application Data

(63) Continuation of application No. 17/398,754, filed on Aug. 10, 2021, now Pat. No. 11,285,058, which is a continuation of application No. 17/078,401, filed on Oct. 23, 2020.

(60) Provisional application No. 62/925,512, filed on Oct. 24, 2019.

(51) Int. Cl.
*A61G 3/08* (2006.01)

(52) U.S. Cl.
CPC ........... *A61G 3/085* (2013.01); *A61G 3/0825* (2013.01); *A61G 3/0833* (2013.01); *A61G 3/0841* (2013.01); *A61G 3/0858* (2013.01); *A61G 3/0866* (2013.01); *A61G 2203/70* (2013.01)

(58) Field of Classification Search
CPC .... A61G 3/0816; A61G 3/085; A61G 3/0825; A61G 3/0833; A61G 3/0841; A61G 3/0858; A61G 3/0866; A61G 2203/70
See application file for complete search history.

(56) References Cited

U.S. PATENT DOCUMENTS

| | | | |
|---|---|---|---|
| 882,012 | A | 3/1908 | Morris |
| 1,178,360 | A | 4/1916 | Tudor |
| 1,263,918 | A | 4/1918 | Miller |
| 2,307,172 | A | 1/1943 | Vanhooser |

(Continued)

FOREIGN PATENT DOCUMENTS

| | | | |
|---|---|---|---|
| CN | 1284936 | C | 4/2006 |
| CN | 107672513 | | 2/2018 |

(Continued)

*Primary Examiner* — Hilary L Gutman
(74) *Attorney, Agent, or Firm* — Foley & Lardner LLP

(57) ABSTRACT

A litter lift system includes a winch and a lifting strap. The winch includes a rotatable spool. The lifting strap has one end coupled to the rotatable spool and is movable due to rotation of the rotatable spool. The lifting strap has a first lifting segment and a second lifting segment positioned away from the end of the lifting strap coupled to the rotatable spool. The first lifting segment and the second lifting segment are each forked to interface with a frame of a litter at first lifting segment and second lifting segment distal ends, wherein a coupling is attached to the first lifting segment. Rotation of the rotatable spool in a first direction raises the first lifting segment and the second lifting segment. Rotation of the rotatable spool in a second direction different from the first direction lowers the first lifting segment and the second lifting segment.

19 Claims, 11 Drawing Sheets

(56) References Cited

U.S. PATENT DOCUMENTS 2,361,328 A 10/1944 Springer
2,473,364 A 6/1949 Dickinson et al.
3,358,300 A 12/1967 Smith
3,508,787 A 4/1970 Strong
3,512,828 A 5/1970 Craft
3,574,871 A 4/1971 Greene
3,701,395 A 10/1972 Theobald
3,751,103 A 8/1973 Robertson
3,986,459 A 10/1976 Riley
D250,012 S 10/1978 Windecker et al.
4,221,423 A 9/1980 Felton
4,617,706 A 10/1986 Waletzko
4,799,726 A 1/1989 Scott
4,842,326 A 6/1989 Di Vito
4,848,830 A 7/1989 Parson
D324,015 S 2/1992 Quiniones
D325,551 S 4/1992 Quiniones
5,372,339 A 12/1994 Morgan
5,411,450 A 5/1995 Gratton et al.
5,529,376 A 6/1996 Jovan et al.
5,800,106 A * 9/1998 Miller .................. B60P 7/0807 410/97
6,024,528 A 2/2000 Taylor
6,186,575 B1 2/2001 Fisher et al.
6,644,708 B1 11/2003 Grzegorzewski et al.
6,851,739 B2 2/2005 Morley
6,890,014 B1 5/2005 King et al.
7,028,351 B1 4/2006 Frieder et al.
7,452,027 B2 11/2008 Hensler et al.
7,810,876 B2 10/2010 Hedderly
7,883,133 B2 2/2011 Chinn
8,205,703 B2 6/2012 Halliday
8,408,623 B1 4/2013 McAuliff
8,602,475 B2 12/2013 Fletcher et al.
8,733,826 B1 5/2014 Montone et al.
8,840,163 B1 9/2014 Wilhelm et al.
9,008,913 B1 4/2015 Sears et al.
9,017,003 B2 4/2015 Nims et al.
9,045,014 B1 6/2015 Verhoff et al.
9,174,686 B1 11/2015 Messina et al.
9,611,975 B2 4/2017 Chinn et al.
9,656,590 B2 5/2017 Johnson et al.
9,707,869 B1 7/2017 Messina et al.
10,099,598 B2 10/2018 Gurin et al.
11,059,526 B2 7/2021 Gallagher et al.
11,407,339 B2 * 8/2022 Johnson ................ B60N 2/919
2003/0168874 A1 9/2003 Bautista, Jr.
2004/0002794 A1 1/2004 Pillar et al.
2005/0113996 A1 5/2005 Pillar et al.
2005/0234622 A1 10/2005 Pillar et al.
2005/0239586 A1 * 10/2005 Nebel .................... A63H 17/05 474/58
2006/0066131 A1 * 3/2006 Nebel ...................... B60P 3/39 296/156
2007/0226901 A1 * 10/2007 Pervorse .................. B60P 1/02 5/118
2008/0114513 A1 5/2008 Pillar et al.
2009/0014602 A1 1/2009 Frost
2009/0072564 A1 3/2009 Teeple
2010/0132113 A1 6/2010 Roepke
2012/0006873 A1 1/2012 Chinn
2014/0167437 A1 6/2014 Montone et al.
2014/0227892 A1 8/2014 Chinn
2014/0255136 A1 9/2014 Malcolm et al.
2015/0210313 A1 7/2015 Sears et al.
2015/0239387 A1 8/2015 Marasco et al.
2017/0001552 A1 * 1/2017 Roe ......................... B60P 3/079
2017/0028900 A1 2/2017 Stocks et al.
2017/0296404 A1 10/2017 Burkeen
2021/0121340 A1 4/2021 Malcolm et al.
2021/0178874 A1 6/2021 Boyle et al.
2021/0276423 A1 9/2021 Lombardo et al.
2021/0276847 A1 9/2021 Neubauer et al.
2021/0276848 A1 9/2021 Miller et al.
2022/0017158 A1 1/2022 Mar

FOREIGN PATENT DOCUMENTS

EP 0 162 587 A 11/1985
EP 1 090 620 4/2001
FR 2643244 A1 8/1990
WO WO-91/09751 A1 7/1991
WO WO-2012/036726 3/2012

* cited by examiner

LITTER LIFT SYSTEM

CROSS-REFERENCE TO RELATED APPLICATION

This application is a continuation of U.S. patent application Ser. No. 17/398,754, filed Aug. 10, 2021, now U.S. Pat. No. 11,285,058 which is a continuation of U.S. patent application Ser. No. 17/078,401, filed Oct. 23, 2020, which claims priority to U.S. Provisional Patent Application No. 62/925,512, filed Oct. 24, 2019, all of which are hereby incorporated by reference in their entireties.

BACKGROUND

Ambulance-type vehicles typically include a mechanism to position and secure a stretcher or "litter" to the floor of the vehicle. The ambulance-type vehicles are typically designed to accommodate one sick, injured, or wounded person away from an event. Occasionally, an ambulance must transport several wounded or injured personnel away from an event simultaneously.

SUMMARY

One exemplary embodiment relates to a litter lift system. The litter lift system includes a winch and a lifting strap. The winch includes a rotatable spool. The lifting strap has one end coupled to the rotatable spool and is movable in response to rotation of the rotatable spool. The lifting strap has a first lifting segment and a second lifting segment positioned away from the end of the lifting strap coupled to the rotatable spool. The first lifting segment and the second lifting segment are each forked to interface with a frame of a litter at a first lifting segment distal end and a second lifting segment distal end, wherein a coupling is attached to the first lifting segment. Rotation of the rotatable spool in a first direction raises the first lifting segment and the second lifting segment. Rotation of the rotatable spool in a second direction different from the first direction lowers the first lifting segment and the second lifting segment.

Another exemplary embodiment relates to a vehicle. The vehicle includes a frame, a vehicle body, and a litter lift system. The vehicle body is supported by the frame, and includes a passenger compartment. The litter lift system is positioned at least partially within the passenger compartment. The litter lift system includes a winch and a lifting strap. The winch includes a rotatable spool. The lifting strap has one end coupled to the rotatable spool and is movable in response to rotation of the rotatable spool. The lifting strap has a first lifting segment and a second lifting segment positioned away from the end of the lifting strap coupled to the rotatable spool wherein the first lifting segment and the second lifting segment are each forked to interface with a frame of a litter at a first lifting segment distal end and a second lifting segment distal end. A first magnetic component is attached to the first lifting segment and a first magnet is coupled to a ceiling panel, and wherein the first metallic component and the first magnet are configured to form a removable coupling to secure the first lifting segment to the ceiling panel. Rotation of the rotatable spool in a first direction raises the first lifting segment and the second lifting segment away from a floor of the passenger compartment. Rotation of the rotatable spool in a second direction different from the first direction lowers the first lifting segment and the second lifting segment toward the floor of the passenger compartment.

Another exemplary embodiment relates to a vehicle. The vehicle includes a chassis, a vehicle body, a litter support system, and a litter lift system. The vehicle body is supported by the chassis, and has a passenger compartment. The litter support system has a frame defined by two channels. The litter lift system is configured to raise a litter received within the channels away from the frame. The litter lift system is configured to raise a litter received within the channels away from the frame.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to a litter lift system adapted for use within a vehicle, such as an ambulance or light tactical military vehicle, which can accommodate and transport several wounded or injured personnel away from an incident simultaneously. In other embodiments, the vehicle is an airplane, a tank, or still another system. In still other embodiments, the litter lift system is provided as part of a building or other non-vehicle system. The litter lift system generally includes a lifting strap that is coupled to a motor-driven winch system that can rotate to adjust a vertical position of two separate lifting segments of the lifting strap at an approximately even rate to suspend and balance a litter above the floor of a vehicle or surface (in the case of a non-vehicle use). Rotation of the winch system raises or lowers the lifting straps and litters suspended by the lifting straps to maintain the litter in an approximately parallel relationship with the floor of the vehicle below.

The winch system is coupled to or positioned near the roof or ceiling of the vehicle body. A portion of the lifting strap is routed above the ceiling and along (e.g., below) the roof of the vehicle body, outside the passenger compartment. Each lifting segment of the lifting strap is suspended downward, through passageways formed in the ceiling of the vehicle body, and into the passenger compartment where the lifting straps can be coupled to a NATO-style litter or other stretcher-type structure. When coupled to the lifting segments of the lifting strap, rotation of the winch system (in a first direction) raises and suspends the litter from the floor of the vehicle. By suspending the litter off of the floor of the vehicle body, the area of the vehicle below the suspended litter can be used to accommodate additional patients (e.g., on a second litter) or personnel. Otherwise unused vertical space within the vehicle body can be used by the patient suspended by the litter lift system. The vehicle can be outfitted with two identical litter lifting systems positioned on each side of the vehicle body to accommodate four or more litters within the same vehicle simultaneously, with two litters being suspended and two litters being positioned at or near the floor of the vehicle body.

Figure 1:
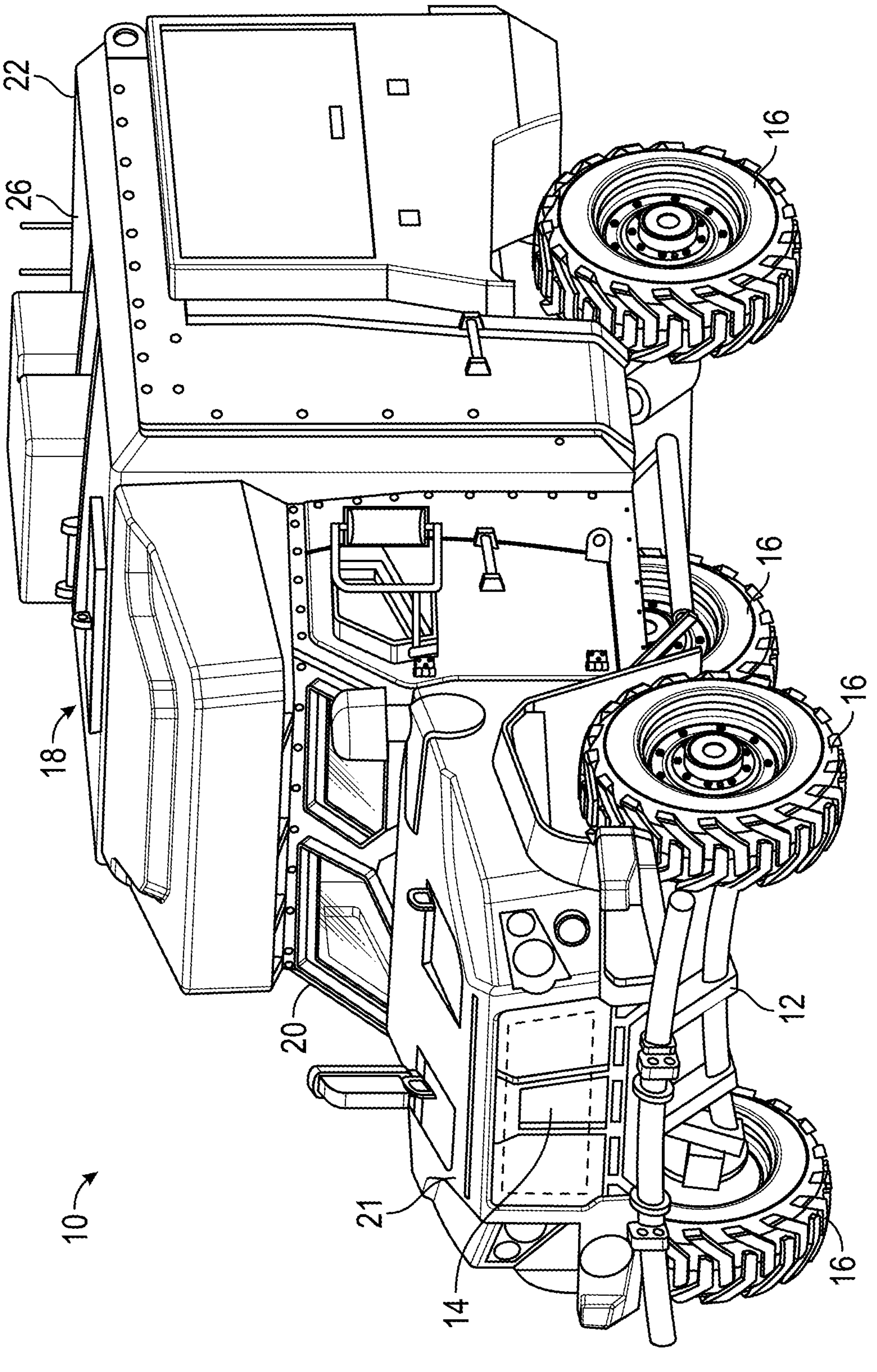
FIG. 1 is a perspective view of a vehicle, according to an exemplary embodiment.

Referring now to FIG. 1, a vehicle, shown as light-tactical vehicle 10 is provided. The vehicle 10 can be an ambulance-style vehicle that is adapted for use in combat situations. The vehicle 10 generally includes a frame, shown as chassis 12, a prime mover, shown as engine 14, that is supported by the chassis 12, and tractive elements, shown as wheels 16 driven by the engine 14 (e.g., through a transmission, a differential, or direct drive). Although shown as an engine 14, the prime mover can be selected or configured to operate using a variety of different primary fuel sources, including diesel fuel, petroleum, battery power, compressed natural gas, a combination of one or more of these fuel sources, or other suitable fuel sources. In some examples, the prime mover is configured as an electric motor and the chassis 12 supports one or more battery cells (e.g., lithium-ion cells) to power the prime mover.

A vehicle body 18 is supported by the chassis 12. The vehicle body 18 includes both a cab 20 and a passenger compartment 22. The cab 20 can generally include vehicle control components, including a steering wheel (or joystick), gas and brake pedals, and a clutch system, for example. The cab 20 can also include seating to accommodate a vehicle driver and one or more passengers. In some autonomous versions of the vehicle 10, the steering wheel and control pedals are omitted from the cab 20. A hood 21 of the vehicle 10 extends forward from the cab 20 to house the prime mover (e.g., the motor 14) and various other vehicle subsystems (e.g., oil systems, HVAC systems, etc.)

The passenger compartment 22 is positioned behind the cab 20 on the vehicle chassis 12. The passenger compartment 22 is defined by a larger volume than the cab 20, and can be used to house various types of medical equipment, for example, to administer care to injured or wounded personnel at or while driving away from an incident location. Each of the cab 20 and passenger compartment 22 can be defined by an outer, armored steel plate construction. The cab 20 and the passenger compartment 22 can be joined together so that an internal passageway is formed between the cab 20 and the passenger compartment 22. Accordingly, personnel within the vehicle 10 can travel between the cab 20 and the passenger compartment 22 without exiting the vehicle 10.

Figure 2A:
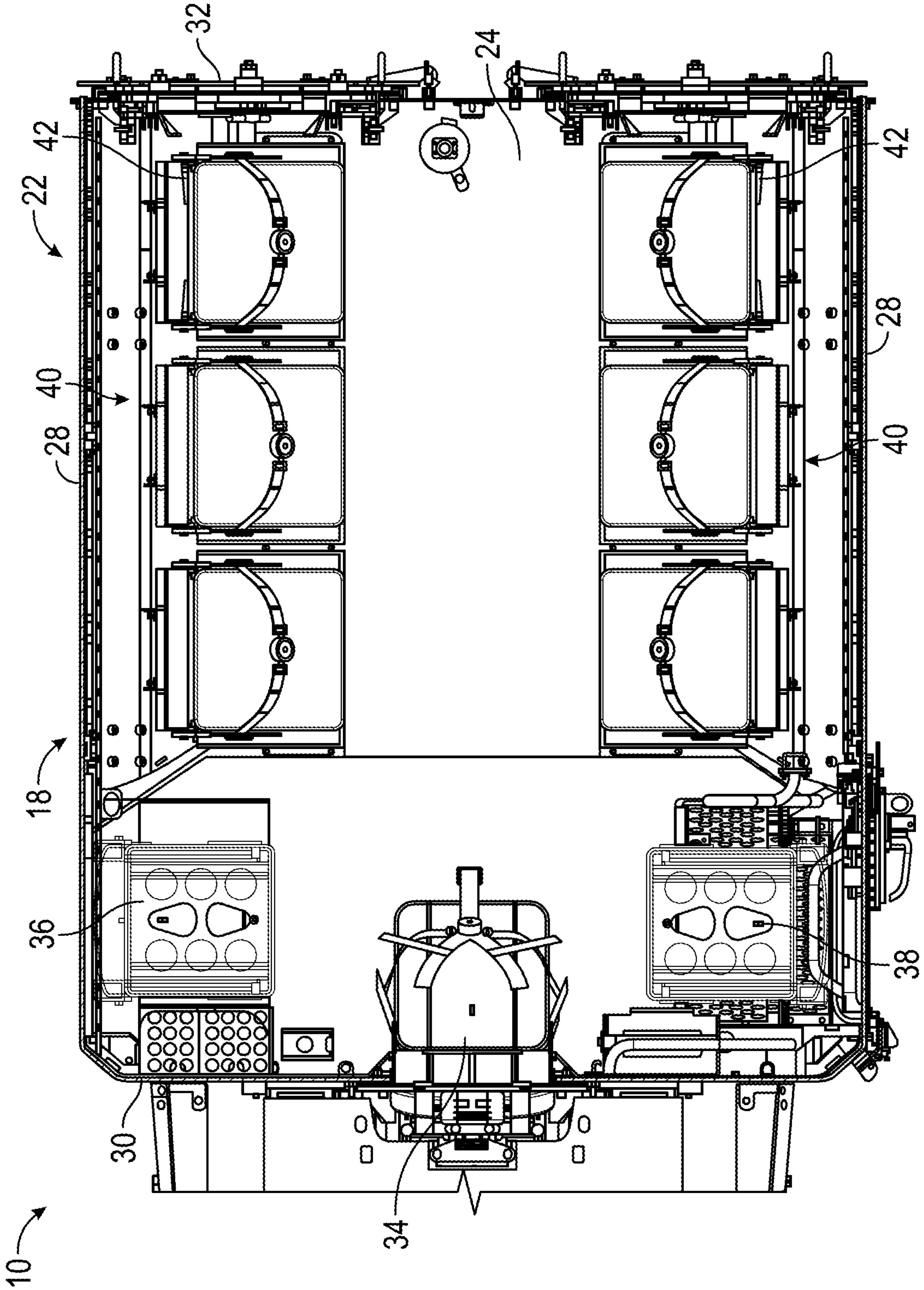
FIGS. 2A and 2B are top views of the vehicle of FIG. 1, with a portion of a vehicle body removed to depict internal components, according to an exemplary embodiment.
Figure 2B:
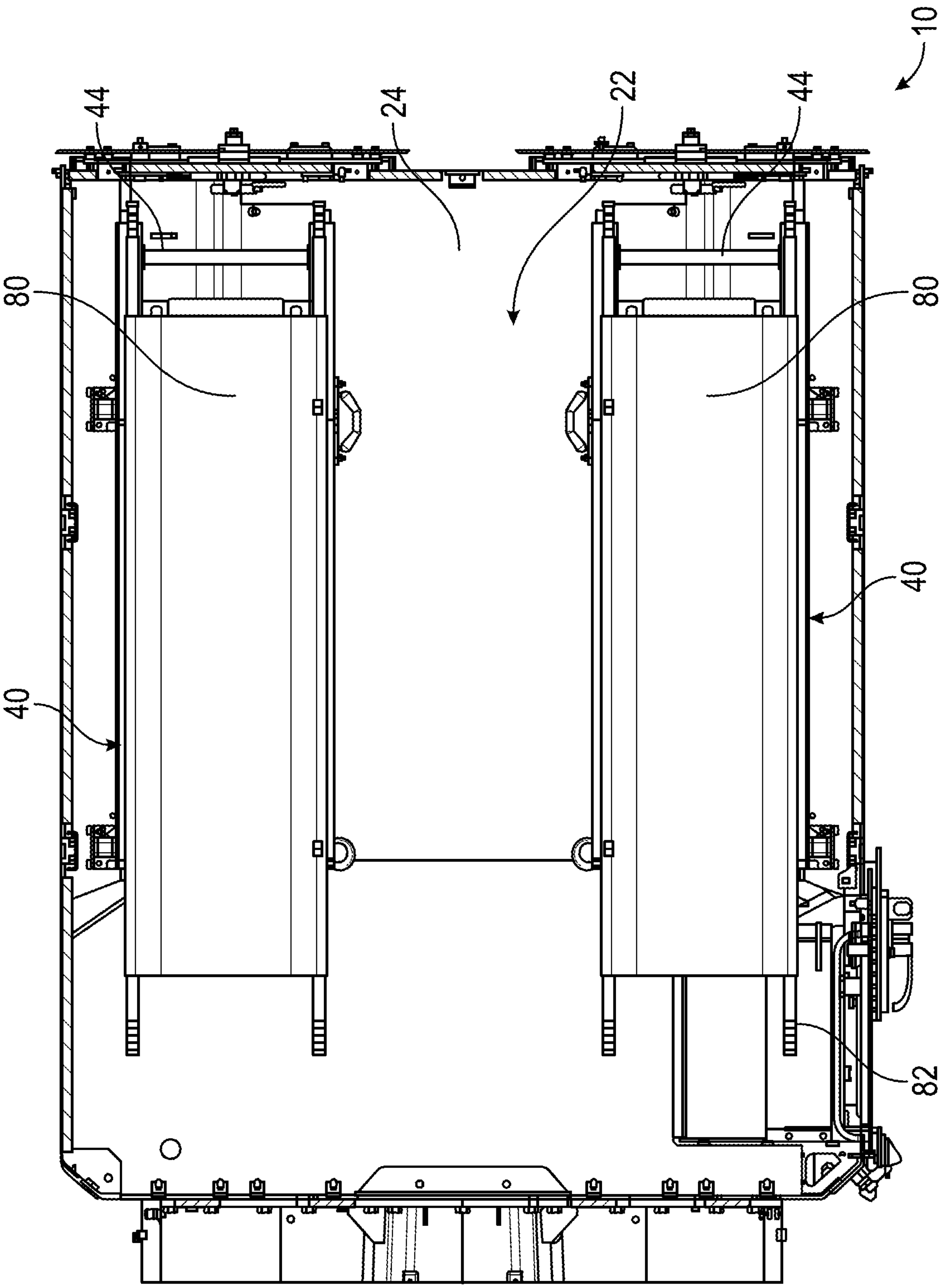

With additional reference to FIGS. 2A and 2B, the interior of the passenger compartment 22 within the vehicle body 18 is shown. The passenger compartment 22 is defined by a floor 24, a roof 26, and sidewalls 28 including a front wall 30 and a rear wall 32 extending between the floor 24 and the roof 26. The passenger compartment 22 has a generally rectangular perimeter, and can be accessed through both the rear wall 32 and the front wall 30. In other embodiments, the passenger compartment 22 is accessible through a sidewall or vertically (e.g., through the roof 26). The passenger compartment 22 can be formed of plate steel or steel alloy that provides additional armor to the vehicle 10. In some examples, the sidewalls 28 are formed of aluminum or aluminum alloy material to reduce an overall weight of the vehicle 10.

The passenger compartment 22 is designed to transport personnel and/or equipment. For example, seating can be provided within the interior of the passenger compartment 22 to help transport personnel within the passenger compartment 22. As shown in FIG. 2A, seating is provided around the perimeter of the passenger compartment 22. In some examples, a command seat 34 is centered along the front wall 30 of the passenger compartment 22. First and second perimeter seats 36, 38 can be positioned along the sidewalls 28 near the front of the passenger compartment 22 as well.

Litter support systems 40 can be positioned along each sidewall 28, extending away from the rear wall 32 of the vehicle body 18. The litter support systems 40 can each rotate between a stowed position (shown in FIG. 2A) and a deployed position (shown in FIGS. 2B, 4A-4B). In the stowed position, the litter support system 40 provides an array of seatbacks 42 that create ambulatory seating for one or more people, such that the vehicle 10 can be used to transport several people within the passenger compartment 22 simultaneously. In the deployed position, the array of seatbacks 42 is rotated downward, toward the floor 24, exposing a frame 44 that can support one or more litters 80 and/or patients on litters 80. The seatbacks 42 can be constructed to move individually or as a group.

Figure 3:
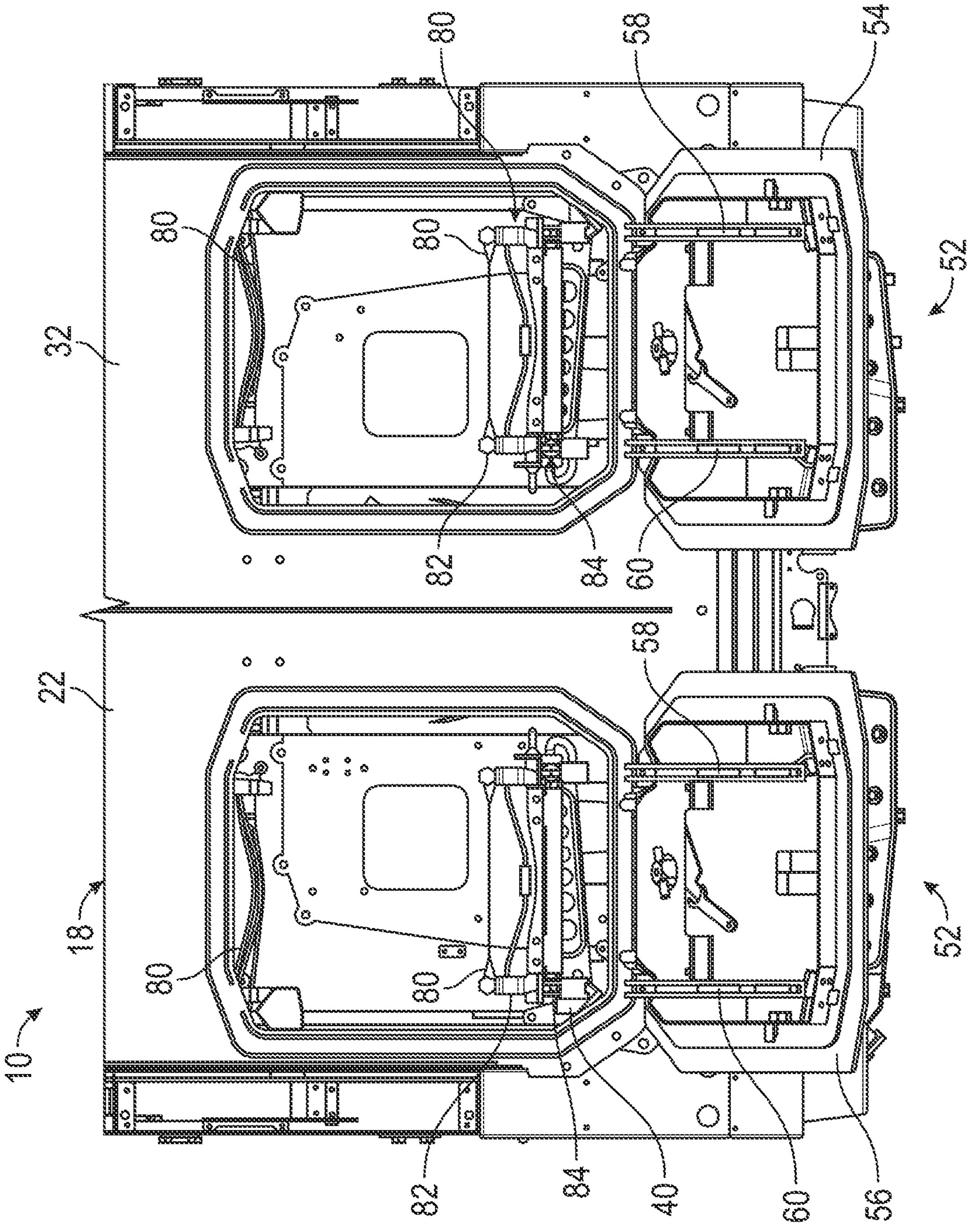
FIG. 3 is a rear view of the vehicle of FIG. 1.
Figure 4A:
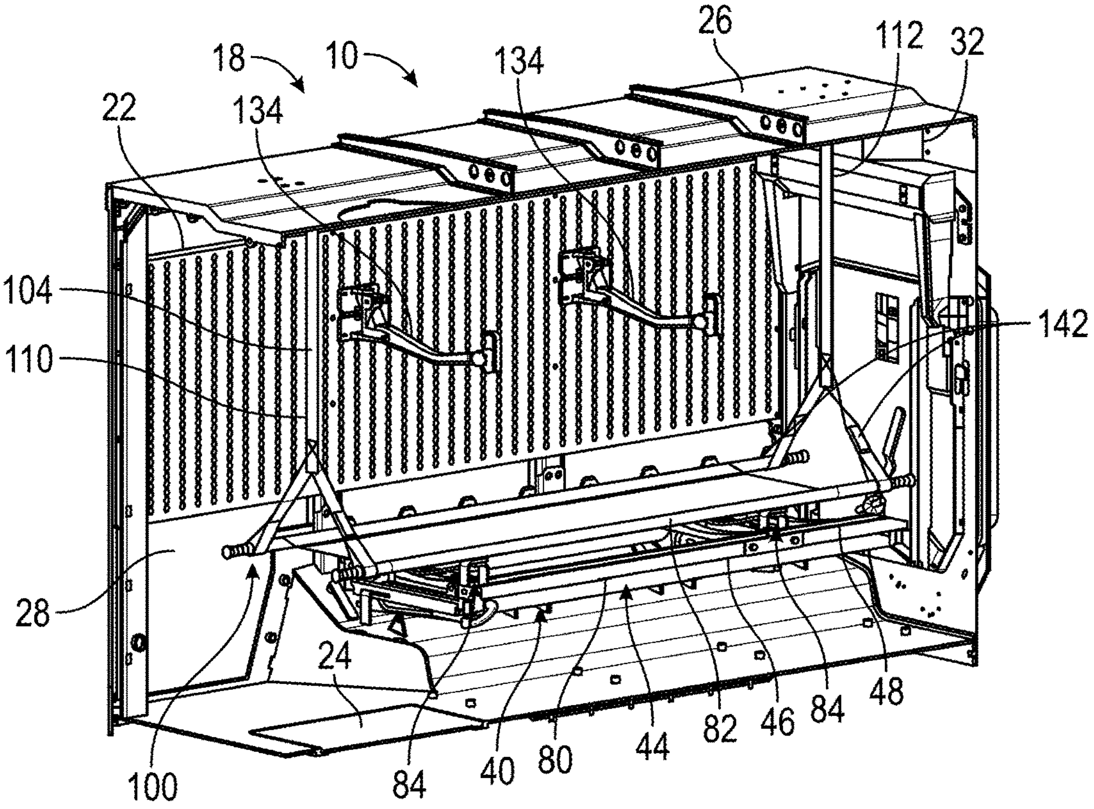
FIG. 4A is an interior perspective cross-sectional view of the vehicle of FIG. 1, taken along line 4-4 in FIG. 1, with a litter lift system of the vehicle in a lowered position.
Figure 4B:
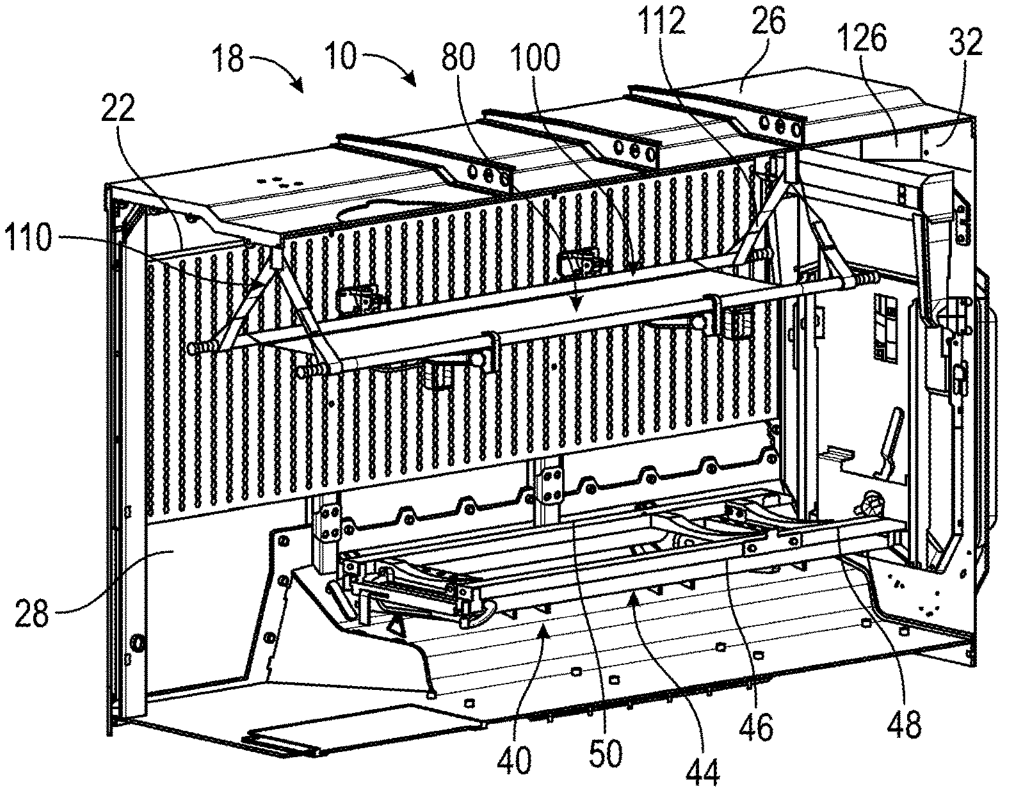
FIG. 4B is an interior perspective cross-sectional view of the vehicle of FIG. 1, taken along line 4-4 in FIG. 1, with the litter lift system of the vehicle in a raised position.

With additional reference to FIGS. 2B-4B, rear loading mechanisms 52 and the litter support systems 40 are shown in the deployed position. With the array of seatbacks 42 folded downward, the frame 44 extends approximately parallel to the floor 24 of the vehicle 10. The frame 44 includes a base 46 that is mounted to the rear side of the array of seatbacks 42. As shown in FIGS. 4A-4B, the base 46 includes two channels 48, 50 spaced apart from one another to define parallel tracks that extend approximately the entire length of the seatback array 42. The parallel tracks are sized and positioned to slidably receive the feet 84 that extend downward from the frame 82 of a litter 80.

Litters 80 can be loaded onto the litter support system 40 through a rear loading mechanism 52, shown in FIG. 3. The rear loading mechanism 52 can be mounted to rear doors 54, 56 formed in the rear wall 32 of the passenger compartment 22, for example, and can be deployed when the rear doors 54, 56 are opened to allow external access into the passenger compartment 22. Like the litter support systems 40, the rear loading mechanism 52 includes two channels 58, 60 extending along a length of the rear doors 54, 56. The channels 58, 60 of the rear loading mechanism 52 are aligned with the channels 48, 50 of the litter support system 40, which promotes an efficient litter loading process.

To load a litter 80 into the litter support system 40 within the passenger compartment 22, the litter 80 is lifted from the ground. The front legs 84 of a litter 80 can first be loaded into the channels 58, 60 of the rear loading mechanism 52 and then slid upward, at an acute angle to the floor 24 and channels 48, 50, until the rear legs 84 are also received within the channels 58, 60. The spacing between the channels 58, 60 of the rear loading mechanism 52 and the channels 48, 50 of the litter support system 40 is limited so that once the front legs 84 of a litter 80 pass upwardly and outwardly beyond the channels 58, 60, the litter 80 rotates toward a position parallel to the floor 24 of the passenger compartment 22. The rotation of the litter 80 toward the floor 24 rotates the front legs 84 of the litter 80 into the channels 48, 50 of the litter support system 40. The litter 80 can then be urged further forward until the rear legs 84 of the litter 80 are also received within the channels 48, 50 of the litter support system 40. With front and rear legs 84 within the channels 48, 50 of the litter support system 40, the litter 80 can be slid forward within the passenger compartment 22 until the litter 80 is received entirely within the passenger compartment 22. After a successful litter loading process is performed, the rear doors 54, 56 can be rotated upward and secured to the rear wall 32 of the passenger compartment 22.

Litters 80 received upon the frame 44 of the litter support system 40 can be elevated off the frame 44 so that additional litters and/or personnel can be secured within the passenger compartment 22 of the vehicle 10. As shown in FIGS. 4A-4B, a litter lift system 100 can be positioned at least partially within the passenger compartment 22 of the vehicle body 18 and can be used to suspend and/or lift one or more litters off the litter support system 40 and floor 24 to increase the patient capacity of the vehicle 10 relative to other ambulance style vehicles.

As depicted in FIGS. 4A-7, the litter lift system 100 generally includes a winch system 102 and a lifting strap 104 that is coupled to the winch system 102. The winch system 102 includes a spool 103 that is driven by an electric motor 105. The electric motor 105 includes a shaft which rotates the spool 103 of the winch system 102 to wind or unwind the lifting strap 104. In some examples, the winch system 102 is coupled to the roof 26 of the vehicle body 22. In other embodiments, the winch system 102 is driven using alternative winding mechanisms (e.g., with a hydraulic motor, with a pneumatic motor, with a manual crank, etc.). Winding the winch system 102 (e.g., rotating the winch system 102) alters the amount of lifting strap 104 extending away from the winch system 102, which in turn adjusts a vertical position of the lifting strap 104 within the passenger compartment 22.

The lifting strap 104 is designed to receive, support, and lift a litter 80 away from the floor 24 (or channels 48, 50 of the base 46) of the vehicle body 18. With specific reference to FIG. 7, a first end 108 of the lifting strap 104 is coupled to and wrapped around the spool 103 of the winch system 102. Rotation of the winch system 102 causes the lifting strap 104 to spool or unspool from the winch system 102, depending on the direction of rotation. For example, rotation in the spool 103 in the clockwise direction can cause the lifting strap 104 to wind onto the spool 103, while rotation in the counterclockwise direction can cause the lifting strap 104 to unwind from the spool 103. A second end 110 of the lifting strap 104 opposite the first end 108 forms a front lifting segment that is suspended into the passenger compartment 22. In some examples, a second, rear lifting segment 112 extends downwardly away from the lifting strap 104 at an intermediate location between the first end 108 and the second end 110. The rear or "intermediate" lifting segment 112, like the front lifting segment at the second end 110, is suspended into the passenger compartment 22 of the vehicle body 18. The front lifting segment 110 and the rear lifting segment 112 can be arranged so that they each extend into the passenger compartment 22 of the vehicle body 18 to approximately (e.g., within 6 inches) the same vertical location. The winch system 102 is arranged so that the vertical location of the two lifting segments 110, 112 changes at approximately the same rate (e.g., within 10 percent) as the winch system 102 winds or unwinds. Although described as a singular lifting strap 104, various different embodiments of the lifting strap 104 can be used with the winch system 102. For example, two or more independent lifting straps can be used in combination with the same winch system 102.

Figure 6:
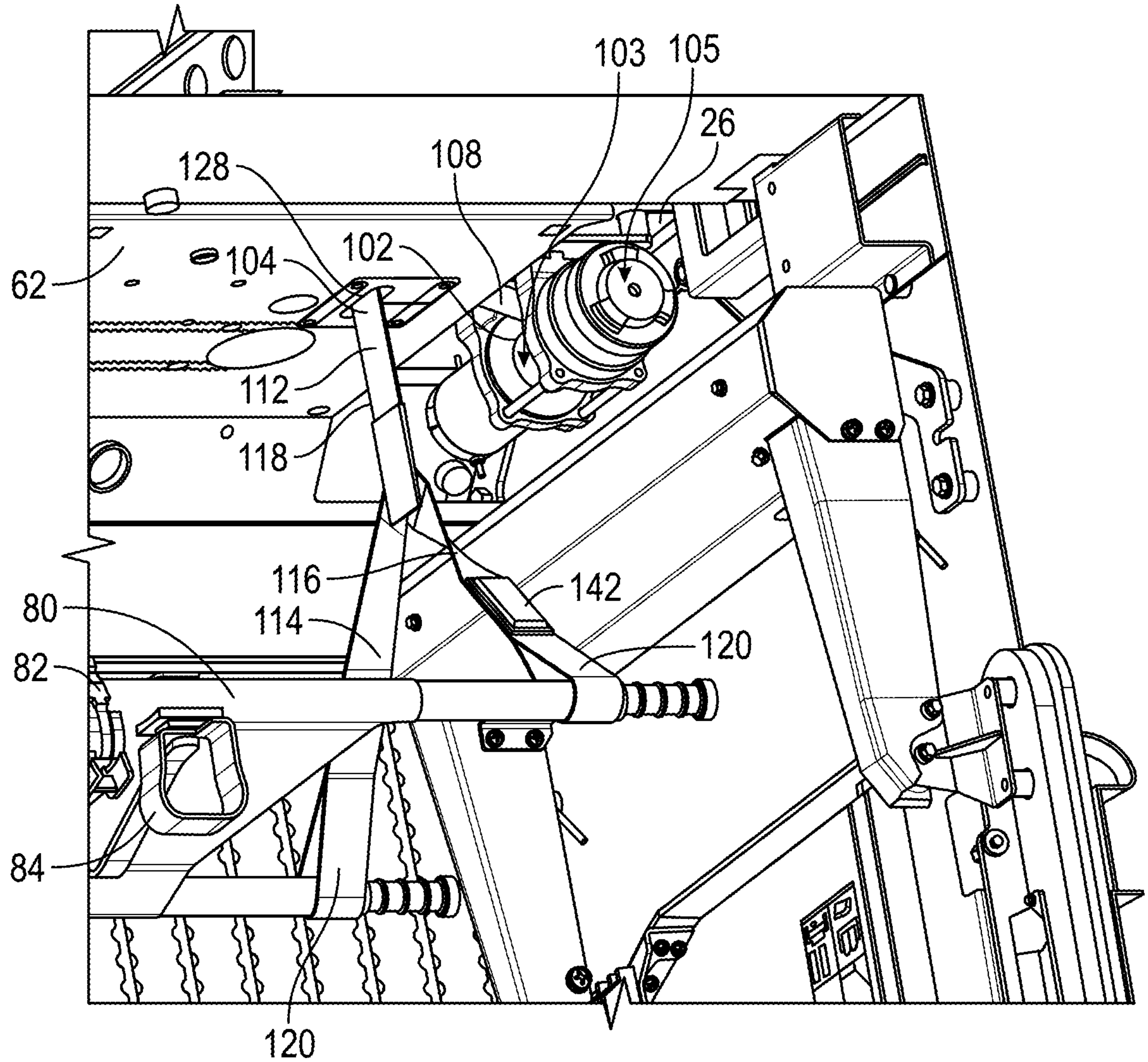
FIG. 6 is a perspective view of a winch system incorporated into the litter lift system of FIG. 4A, with the winch housing of FIG. 5C removed.

The front lifting segment 110 and the rear lifting segment 112 each include a forked structure that is designed to interface with the frame 82 of a litter 80. As depicted in FIG. 6, the forked structures are each defined by a first segment 114 and a second segment 116 diverging away from a primary lifting segment 118. The first segment 114 and second segment 116 each include loops 120 formed at distal ends (e.g., opposite the primary lifting segment 118) of the segments 114, 116, which are sized and adapted to be received around the frame 82 of a litter 80. By interfacing with the outer structure of the litter frame 82, the forked ends of the lifting segments 110, 112 balance the combined weight of the litter 80 and personnel within the litter 80 within the perimeter of the litter, which reduces the possibility of litter tipping.

FIGS. 5A-7 depict the routing of the lifting strap 104 within the vehicle body 18. As indicated above, the winch system 102 is coupled to the vehicle body 18 (e.g., to the roof 26 of the passenger compartment 22 near the rear wall 32, to the roof 26 of the passenger compartment 22 near the front wall, to a sidewall of the vehicle body 18, etc.). The first end 108 of the lifting strap 104 is coupled to the spool 103 of the winch system 102. The lifting strap 104 extends away from the winch system 102, and angles upwardly, above a ceiling panel 62 positioned beneath and extending parallel to the roof 26 of the passenger compartment 22, to a first roller 122. The first roller 122 is mounted to the roof 26 of the passenger compartment 22. The first roller 122 may at least partially assist in tensioning the lifting strap 104. The first roller 122 can also be used to support the rear lifting segment 112, which branches off from the lifting strap 104, wraps around the first roller 122, and is suspended downwardly away from the front side of the first roller 122 and into the passenger compartment 22 of the vehicle 10.

Figure 7:
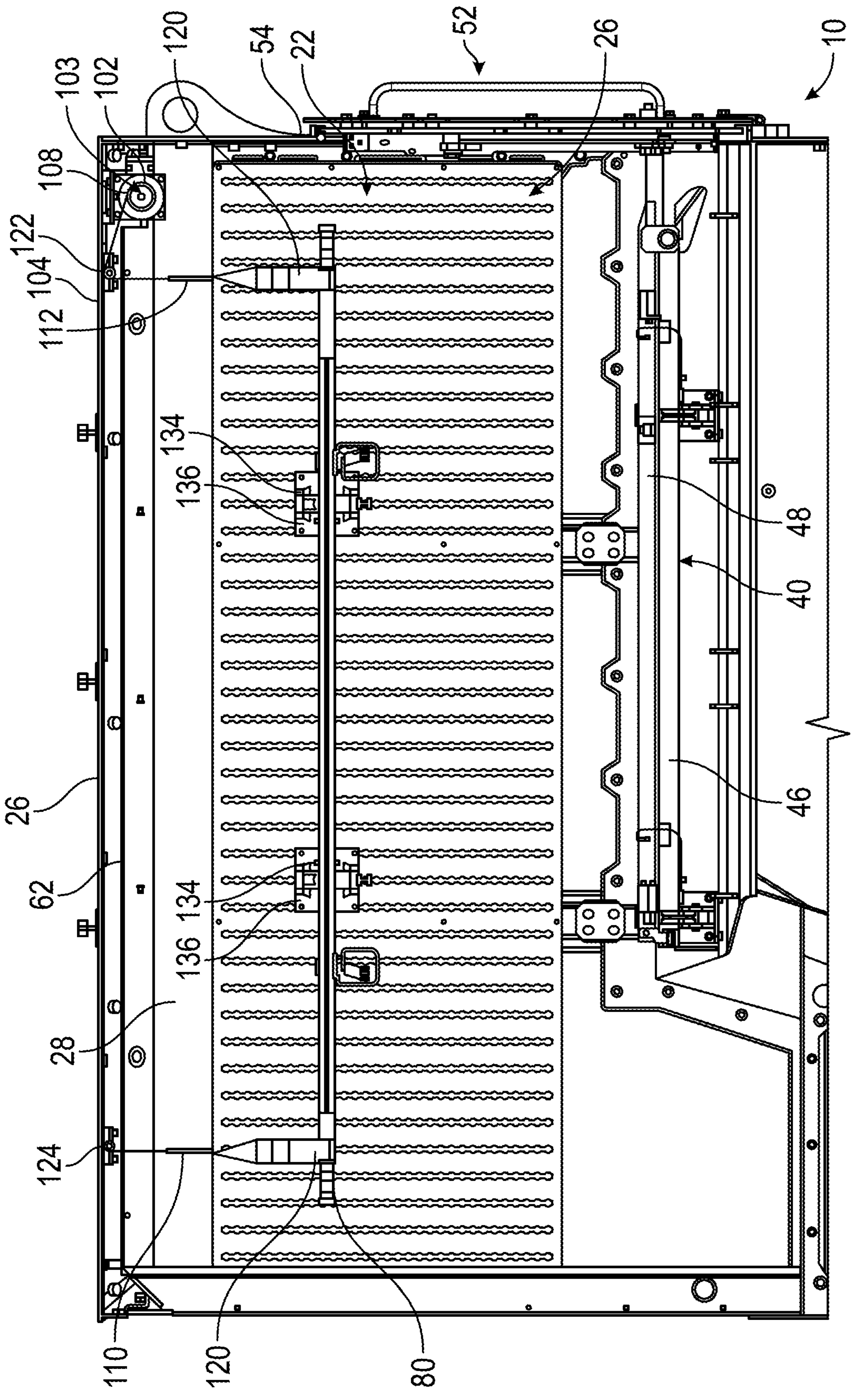
FIG. 7 is a cross-sectional view of a passenger compartment of the vehicle of FIG. 1.

The lifting strap 104 extends forward from the first roller 122, above the ceiling panel 62 and approximately parallel to the floor 24 of the passenger compartment 22, to a second roller 124. The second roller 124, like the first roller 122, is mounted to the roof 26 of the passenger compartment 22. The second end and front lifting segment 110 of the lifting strap 104 wraps around the second roller 124 and is suspended downwardly, away from the front side of the second roller 124 and into the passenger compartment 22 of the vehicle 10. As depicted in FIG. 7, at least half of the lifting strap 104 extends above the ceiling panel 62 and parallel to the roof 26.

Figure 5A:
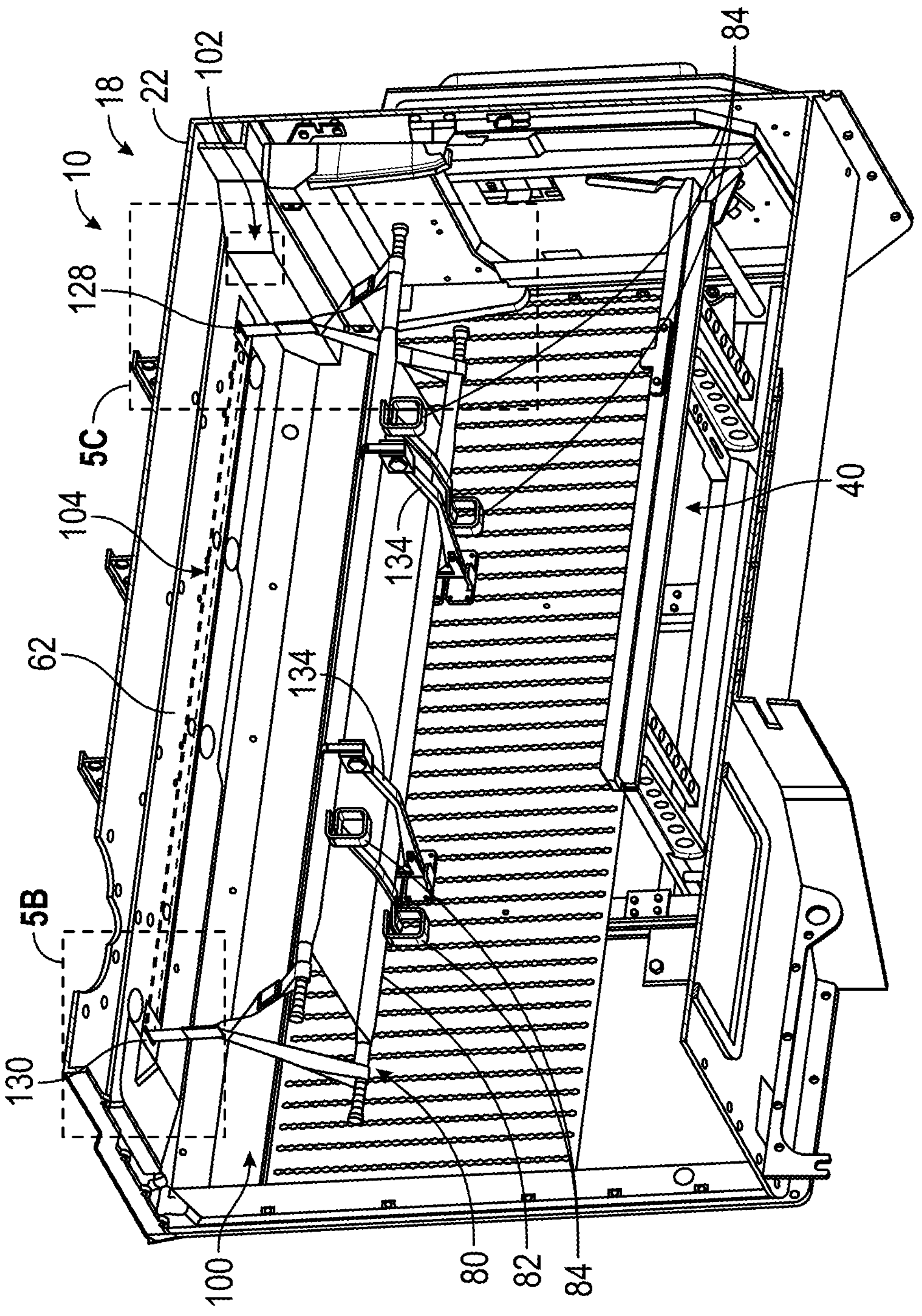
FIG. 5A is another interior perspective view of the vehicle of FIG. 1.
Figure 5B:
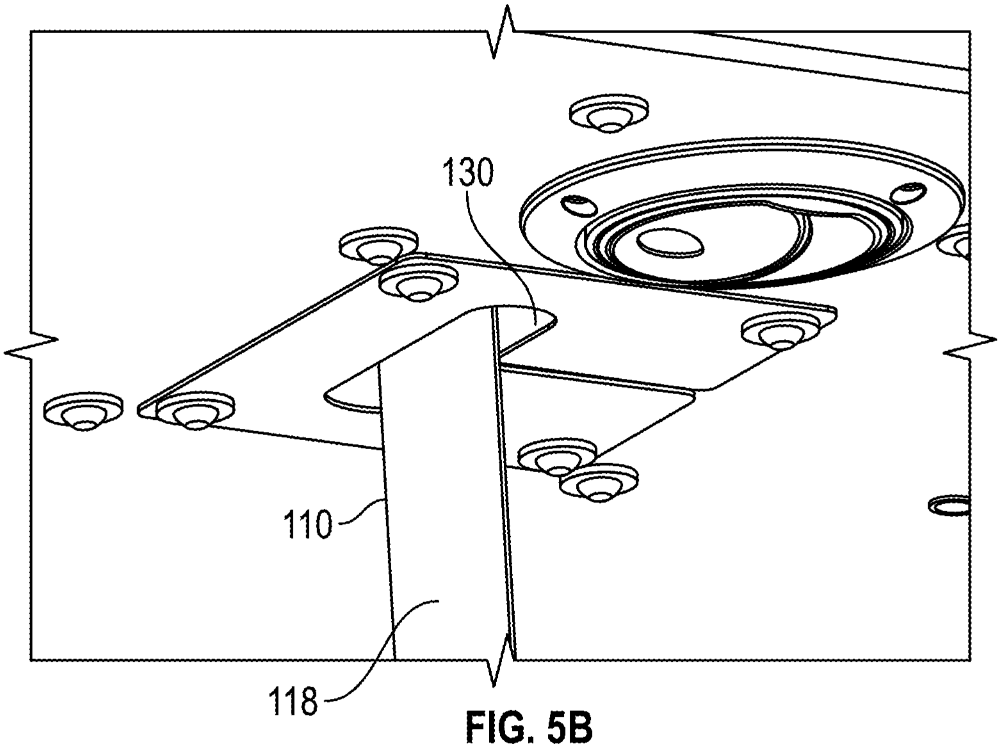
FIG. 5B is a detailed view of a front strap interface formed within the vehicle body of the vehicle of FIG. 1, taken from the section 5B in FIG. 5A.
Figure 5C:
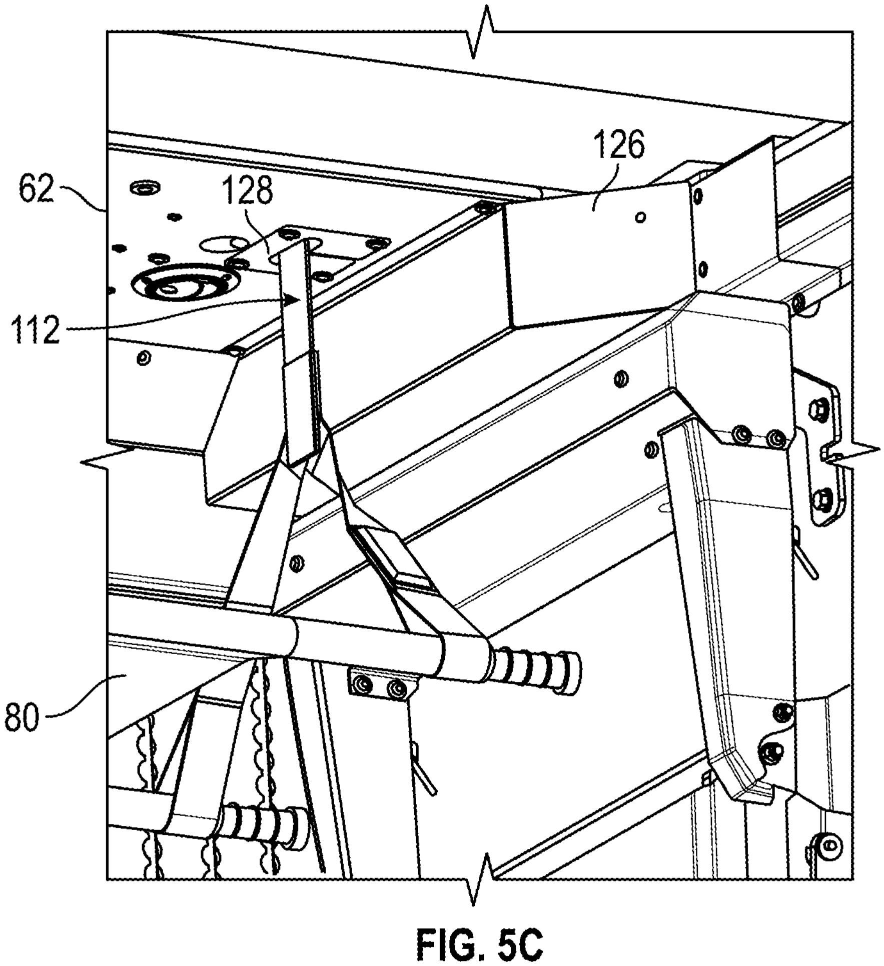
FIG. 5C is a detailed view of a rear strap interface and a winch housing formed within the vehicle body of the vehicle of FIG. 1, taken from the section 5C in FIG. 5A.

The lifting strap 104 and winch system 102 are arranged so that only a portion of the lifting strap 104 is exposed within the passenger compartment 22 of the vehicle 10. As depicted in FIG. 5A, for example, the entirety of the lifting strap 104, besides the front and rear lifting segments 110, 112, can be either positioned above the ceiling panel 62 of the passenger compartment 22 or behind a winch cover 126 that surrounds and conceals the winch system 102. The front and rear lifting segments 110, 112 can each extend downwardly through passageways 128, 130 formed within the ceiling panel 62 of the passenger compartment 22. The passageways 128, 130 can be formed as elongate holes through the ceiling panel 62, which are sized to form a clearance fit with the front and rear lifting segments 110, 112 of the lifting strap 104. In some examples, the passageways 128, 130 are aligned with the first and second rollers 122, 124 so that the front and rear lifting segments 110, 112 can extend approximately vertically downward through the passageways 128, 130 and into the passenger compartment 22 below. In some examples, however, the ceiling panel 62 can be uncoupled from the roof 26 or omitted entirely.

Using the litter lift system 100, a litter 80 and associated patient can be elevated (e.g., off of the litter support system 40, etc.), such that an additional litter 80 and patient can be accommodated upon the litter support system 40. The operation of the litter lifting system 100 is demonstrated by FIGS. 4A and 4B with continued reference to FIGS. 5A-7. Once a litter 80 is received upon the litter support system 40, as shown in FIG. 4A, the front and rear lifting segments 110, 112 can be coupled to the litter 80. The lifting loops 120 of the front lifting segment 110 and rear lifting segment 112 are positioned around opposite end portions of the frame 82 of the litter 80 to balance the litter 80.

Figure 8A:
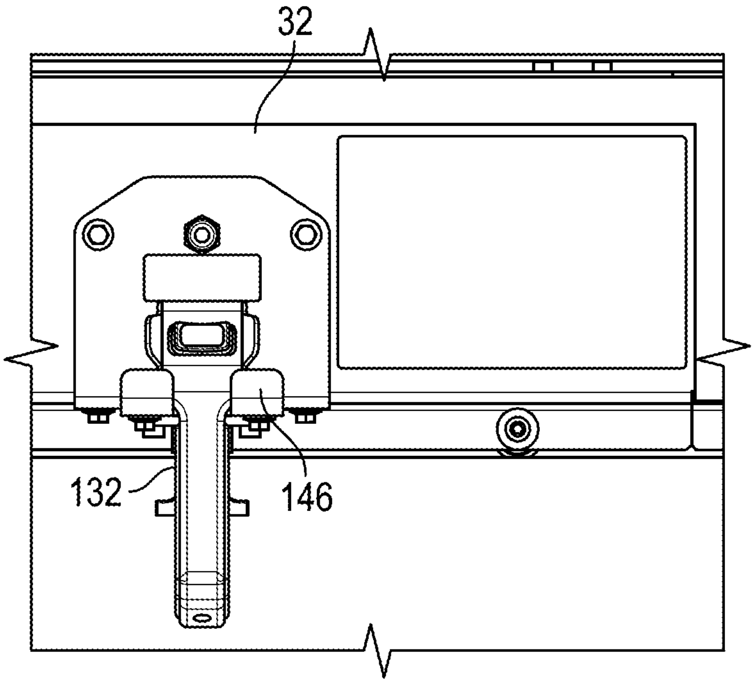
FIG. 8A is a front view of a controller used to control the litter lift system of FIG. 4A.
Figure 8B:
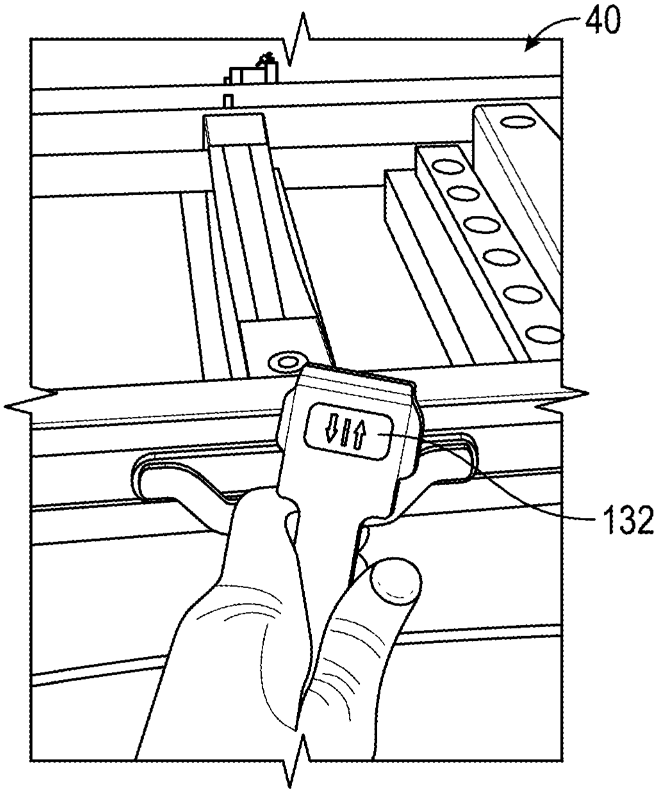
FIG. 8B is a perspective view of the controller of FIG. 8A.
Figure 9:
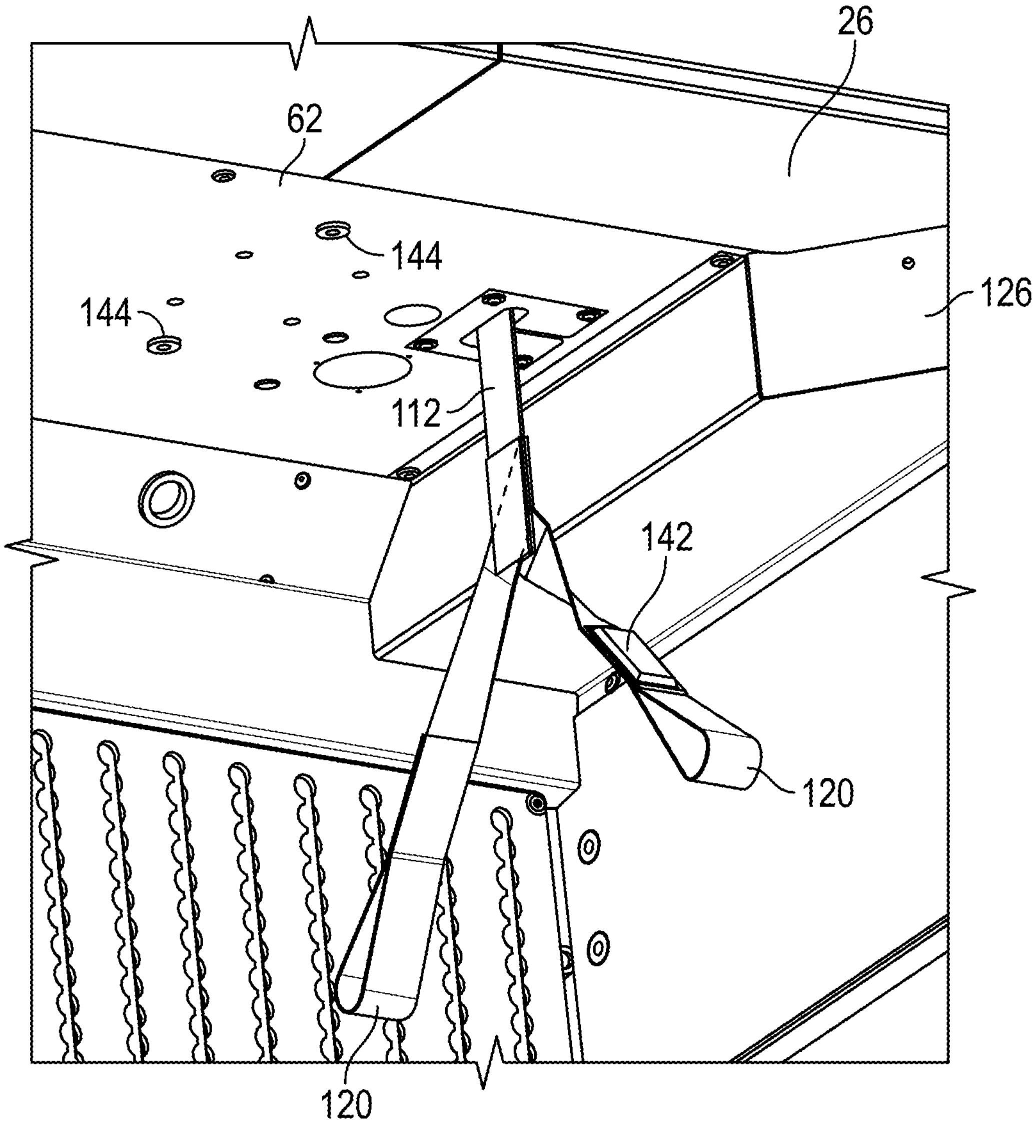
FIG. 9 is a perspective view of a strap of the litter lift system of FIG. 4A.

With the front and rear lifting segments 110, 112 positioned in place around and coupled to the frame 82 of the litter 80, the litter 80 can be raised away from the litter support system 40. A user can then activate the winch system 102 and the electric motor 105 using a controller 132, shown in FIGS. 8A-8B, to begin the lifting process. In some examples, the controller 132 includes separate inputs that indicate a raising or lowering function to be performed by the winch system 102. Upon pressing or otherwise inputting a command to the controller 132, the electric motor 105 activates and rotates the spool 103 of the winch system 102. For example, in response to a command to raise the lifting strap 104, the winch system 102 rotates clockwise and begins to wrap the lifting strap 104 around the spool 103 of the winch system 102. Wrapping the lifting strap 104 around the winch system 102 pulls the front and rear lifting segments 110, 112 toward the winch system 102, over the two rollers 122, 124. The retraction of the lifting segments 110, 112 toward the winch system 102 reduces the amount of lifting strap suspended over each of the rollers 122, 124, which raises both the front and rear lifting segments 110, 112 upwardly. By having each of the front and rear lifting segments 110, 112 formed within the same lifting strap 104, rotation of the winch system 102 causes both the front and rear lifting segments 110, 112 to raise and lower at an approximately equal (e.g., within about 10%) rate when the spool 103 rotates. Accordingly, the front and rear lifting segments 110, 112 remain suspended downward at approximately the same (e.g., within about 6 inches) distance from the rollers 122, 124. When not in use, the controller 132 can be received upon a support 146 formed on the rear wall 32 of the passenger compartment 22.

The litter 80 and lifting strap 104 can be raised by the winch system 102 until a suitable height for the litter 80 is reached within the passenger compartment. Once a desired height is reached, support arms 134 can be positioned in place beneath the litter frame 82, as shown in FIG. 4B. The support arms 134 can be coupled to the sidewalls 28 using brackets 136. In one embodiment, the support arms 134 are rotatable relative to the brackets 136. The support arms 134 have a generally arcuate shape to cradle a litter 80. Once the litter frame 82 is locked into place relative to the rotatable support arms 134, an operator may use the controller 132 to lower the lifting strap 104, which releases some of the tension on the lifting strap 104 and allows the weight of the litter and personnel within the litter to be carried by the support arms 134.

With the litter 80 positioned on the support arms 134 and raised away from the litter support structure 40 below, a second litter can then be received on the litter support structure 40, allowing the vehicle 10 to accommodate multiple litter patients simultaneously. With litter lifting systems 100 positioned on each side of the passenger compartment, up to four (or in some cases, more) litter patients can be received simultaneously within the vehicle 10 and transported away from an incident location. Upon arrival at a hospital or other facility, the litter 80 can once again be suspended and lowered down toward the litter support structure 40 using the lifting strap 104 and winch system 102, which unspools the lifting strap 104 and lowers the litter 80 in response to receiving a command from the controller 132.

When the litter lift system 100 is not in use and not needed, compact storage features can be used to further limit requirements of the litter lift system 100. In some examples, a coupling is positioned on each of the front and rear lifting segments 110, 112 to stow the suspended portions of the lifting strap 104 when not in use. For example, the coupling can be a metallic component 142 (e.g., iron) that is incorporated (e.g., sewn) into each of the first and second segments 114, 116 of the front and rear lifting segments 110, 112. The metallic component 142 can be adapted to releasably couple with opposing magnets 144 positioned on the ceiling panel 62 of the passenger compartment 22. By coupling the metallic components 142 with the opposing magnets 144, the lifting strap 104 can be confined to an area immediately adjacent to the ceiling panel 62, out of the way of passengers moving around within the passenger compartment 22. Alternatively, the couplings can be hooks or fastener panels (e.g., hook and loop fastener panels) that are attached to the front and rear lifting segments 110, 112 to releasably secure the front and rear lifting segments 110, 112 to the ceiling panel 62 when the litter lifting system 100 is not in use.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure.

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the litter lift system as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A litter lift system comprising:

a winch having a rotatable spool; and a lifting strap having one end coupled to the rotatable spool and being movable in response to rotation of the rotatable spool, the lifting strap having a first lifting segment and a second lifting segment, the second lifting segment positioned away from the lifting strap, wherein the first lifting segment and the second lifting segment are each forked to interface with a frame of a litter at a first lifting segment distal end and a second lifting segment distal end, wherein a coupling is attached to the first lifting segment;

wherein rotation of the rotatable spool in a first direction raises the first lifting segment and the second lifting segment; and wherein rotation of the rotatable spool in a second direction different from the first direction lowers the first lifting segment and the second lifting segment.

2. The litter lift system of claim 1, wherein rotation of the rotatable spool in the first direction spools the lifting strap about the rotatable spool to pull the first lifting segment and the second lifting segment toward the winch.

3. The litter lift system of claim 2, wherein rotation of the rotatable spool in the first direction raises the first lifting segment and the second lifting segment vertically relative to the winch by an approximately equal amount.

4. The litter lift system of claim 3, further comprising a first roller and a second roller spaced apart from the first roller, wherein each of the first roller and the second roller are positioned vertically above the winch, wherein the first lifting segment passes over and is suspended downwardly from the first roller below the winch, and wherein the second lifting segment passes over and is suspended downwardly from the second roller below the winch, wherein the second roller is positioned laterally between the first roller and the winch.

5. The litter lift system of claim 4, wherein the first lifting segment extends downwardly from the first roller to a first distance and the second lifting segment extends downwardly from the second roller to a second distance, wherein the first distance and the second distance are less than six inches different.

6. The litter lift system of claim 3, further comprising a first roller positioned vertically above the winch, wherein both of the first lifting segment and the second lifting segment passes over the first roller, and wherein the second lifting segment passes over and is suspended downwardly from the first roller below the winch.

7. The litter lift system of claim 1, wherein the winch is driven by an electric motor, wherein the electric motor is in communication with a controller, the controller being configured to receive an input and, in response to the input, activate the electric motor to rotate the rotatable spool to adjust a vertical position of the first lifting segment and the second lifting segment at an approximately equal rate.

8. A vehicle, comprising:

a frame;

a vehicle body supported by the frame and having a passenger compartment; and a litter lift system positioned at least partially within the passenger compartment, the litter lift system comprising:

a winch having a rotatable spool; and a continuous lifting strap having one end coupled to the rotatable spool and being movable in response to rotation of the rotatable spool, the lifting strap having a first lifting segment and a second lifting segment, the second lifting segment positioned away from the lifting strap, wherein the first lifting segment and the second lifting segment are each forked to interface with a frame of a litter at a first lifting segment distal end and a second lifting segment distal end, wherein a first magnetic component is attached to the first lifting segment and a first magnet is coupled to a ceiling panel, and wherein the first magnetic component and the first magnet are configured to form a removable coupling to secure the first lifting segment to the ceiling panel;

wherein rotation of the rotatable spool in a first direction raises the first lifting segment and the second lifting segment away from a floor of the passenger compartment; and wherein rotation of the rotatable spool in a second direction different from the first direction lowers the first lifting segment and the second lifting segment toward the floor of the passenger compartment.

9. The vehicle of claim 8, wherein the winch is coupled to a roof of the vehicle body and at least half of the continuous lifting strap extends parallel to the roof.

10. The vehicle of claim 9, wherein the passenger compartment is further defined by the ceiling panel coupled to and extending parallel to the roof, wherein at least a portion of the continuous lifting strap extends above the ceiling panel and below the roof.

11. The vehicle of claim 10, further comprising a first roller and a second roller spaced apart from the first roller, wherein the first roller and the second roller are coupled to the roof, and wherein the first lifting segment passes over and is suspended downwardly from the first roller, through the ceiling panel, and into the passenger compartment, and wherein the second lifting segment passes over and is suspended downwardly from the second roller, through the ceiling panel, and into the passenger compartment, and wherein the second roller is positioned between the first roller and the winch.

12. The vehicle of claim 11, wherein the first lifting segment extends downwardly through the ceiling panel to a first distance and the second lifting segment extends downwardly through the ceiling panel to a second distance, wherein the first distance and the second distance are less than six inches different.

13. The vehicle of claim 8, wherein the first lifting segment and the second lifting segment interface with a frame of a litter via two separate lifting loops coupled to a first lifting segment distal end and a second lifting segment distal end respectively.

14. The vehicle of claim 8, wherein the rotatable spool is driven by an electric motor, wherein the electric motor is in communication with a controller, the controller being configured to receive an input and, in response to the input, activate the electric motor to rotate the rotatable spool to adjust a vertical position of the first lifting segment and the second lifting segment at an approximately equal rate.

15. A vehicle, comprising:

a chassis;

a vehicle body supported by the chassis and having a passenger compartment therein;

a litter support system having a frame defined by two channels, wherein the two channels each extend approximately parallel to a longitudinal axis of the chassis to define two separate tracks; and a litter lift system configured to raise a litter received within the channels away from the frame;

the litter lift system comprising:

a winch having a rotatable spool; and a lifting strap system having one end coupled to the rotatable spool and being movable in response to rotation of the rotatable spool, the lifting strap system having a first lifting segment and a second lifting segment, the second lifting segment positioned away from the lifting strap system;

wherein rotation of the rotatable spool in a first direction raises the first lifting segment and the second lifting segment away from the channels; and wherein rotation of the rotatable spool in a second direction different from the first direction lowers the first lifting segment and the second lifting segment toward the channels.

16. The vehicle of claim 15, wherein the first lifting segment is a first lifting strap having one end coupled to the rotatable spool, and the second lifting segment is a second lifting strap having one coupled to the rotatable spool.

17. The vehicle of claim 15, wherein the two channels of the frame are rotatable between a stowed position and a deployed position, wherein in the deployed position, a base of the channels extends parallel to a floor of the passenger compartment.

18. The vehicle of claim 17, wherein the two channels extend along a plurality of seatbacks, and wherein in the stowed position, the plurality of seatbacks are configured to provide ambulatory seating, such that the channels extend along an outer wall of the passenger compartment.

19. The vehicle of claim 15, wherein the litter support system is a first litter support system, wherein the litter lift system is a first litter lift system, and further comprising a second litter support system and a second litter lift system, the first litter lift system operating independent of the second litter lift system.

* * * * *